Dec. 10, 1946.  G. L. BORELL  2,412,386
MECHANICAL TORQUE AMPLIFIER
Filed Jan. 17, 1945  2 Sheets-Sheet 1
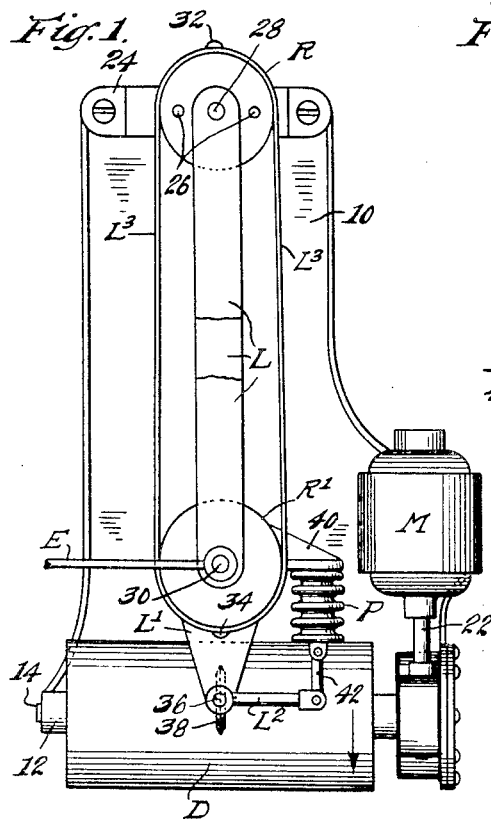
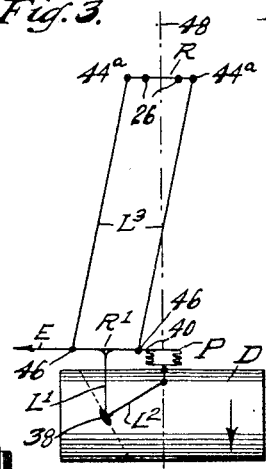
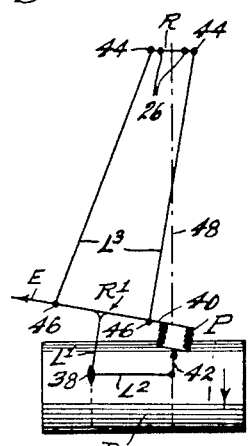
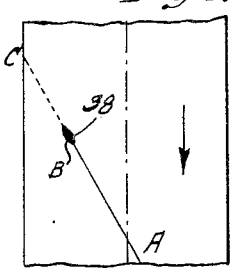
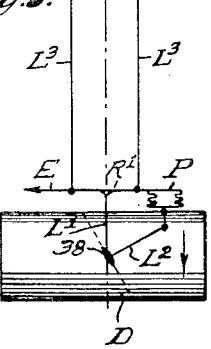
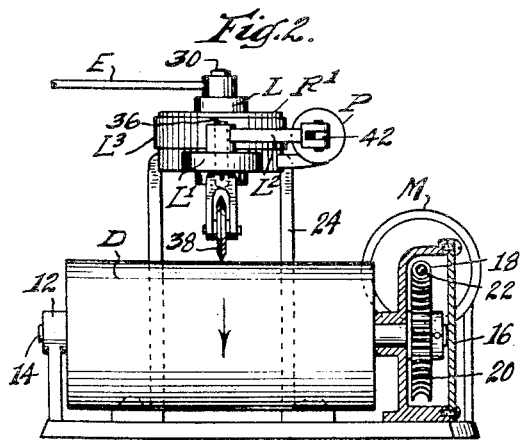
INVENTOR.
George L. Borell,
BY
George H. Fisher
Atty.

Dec. 10, 1946.  G. L. BORELL  2,412,386
MECHANICAL TORQUE AMPLIFIER
Filed Jan. 17, 1945    2 Sheets-Sheet 2

INVENTOR.
GEORGE L. BORELL
BY
George H. Fisher
ATTY.

Patented Dec. 10, 1946

2,412,386

UNITED STATES PATENT OFFICE 2,412,386

MECHANICAL TORQUE AMPLIFIER

George L. Borell, Minneapolis, Minn., assignor to Minneapolis-Honeywell Regulator Company, Minneapolis, Minn., a corporation of Delaware Application January 17, 1945, Serial No. 573,292

21 Claims. (Cl. 74—388)

My present invention relates to a mechanical torque amplifier utilizing power means to amplify relatively delicate and sensitive movements of a condition responsive or pilot means so that the power means effects movement of an actuating element for indicating or control purposes.

One object of the invention is to provide a mechanical torque amplifier which is comparatively simple in construction and which effectively uses the power of an electric motor or the like for moving an indicating or control device to a new position in response to a condition responsive element or the like, which acts as a pilot control and which, for this purpose, is operatively connected with a caster wheel to change the position thereof relative to a caster pivot mounting for the caster wheel.

Another object is to provide a moving surface such as a drum, driven by power means, on which the caster wheel rests in such manner that any movement of the caster wheel in response to the pilot means results in the caster pivot mounting shifting axially of the drum until a rebalanced position is obtained with the actuating element for the indicating or control device moved to a new position corresponding to the new position of the pilot means itself.

Still another object is to provide a linkage arrangement for supporting the caster pivot mounting so that the caster wheel is always brought back into a rebalanced position after being shifted by the pilot means from any position that it may have previously assumed with the linkage arrangement such that the caster wheel describes a tractrix curve on the surface of the drum, resulting in relatively faster movement of the actuating element at first and a gradual slowing down thereof until the rebalanced condition occurs, which results in elimination of all over-run or hunting of the actuating element in relation to any of the movements of the pilot means.

A further object is to provide a mounting means for the caster wheel including links which are pivotally anchored at one end to a stationary base or the like and at the other end to the caster pivot mounting, with the links converging from the mounting toward the base so as to result in rotation of the caster pivot mounting in the same direction in which the mounting is moved, thereby bringing the caster wheel back into alignment with the direction of movement of the moving surface to produce a rebalanced position after any movement of the condition responsive or pilot means throwing it out of balance for the purpose of effecting movement of the actuating element to result in the indicating or control device assuming a new position substantially proportional or corresponding to the new position of the condition responsive means.

With these and other objects in view, my invention consists in the construction, arrangement and combination of the various parts of my device whereby the objects contemplated are attained, as hereinafter more fully set forth, pointed out in the claims and illustrated in the accompanying drawings, wherein:

Fig. 1 is a plan view of a torque amplifier embodying my invention and showing one form of linkage arrangement therefor;

Fig. 2 is a front elevation of Fig. 1;

Fig. 3 is a diagrammatic view somewhat similar to Fig. 1 and showing a pair of links as the linkage arrangement rather than a belt or ribbon around rollers, this figure illustrating a linkage arrangement which will not perform quite as satisfactorily, but which is illustratively included to aid in understanding the principles involved;

Fig. 4 is a layout of a movable surface and the caster wheel path corresponding to Fig. 3;

Fig. 5 is a view of a portion of Fig. 3 showing the initial position of the caster wheel on the center line of the moving surface;

Fig. 6 is a view similar to Fig. 3 showing a similar linkage arrangement but with different pivot spacing so as to accomplish the results desired;

Fig. 7 is a layout view of the moving surface for Fig. 6 illustrating the tractrix curve described by the caster wheel of Figs. 1 and 6 on the moving surface;

Figure 8:
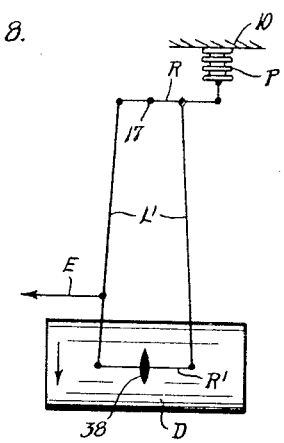
Figs. 8 and 9 are diagrammatic views of possible modifications to accomplish the same results.

On the accompanying drawings I have used the reference numeral 10 to indicate a base merely as an example of something on which the mechanism of my torque amplifier may be mounted. The base 10 has a bearing 12 thereon for a drum shaft 14 of a drum D. The drum shaft 14 extends into a gear housing 16 wherein are located suitable gears such as a worm 18 and a worm gear 20. The worm 18 may be driven by any suitable power means, such as an electric motor M, on the shaft 22 of which the worm gear 18 is mounted.

A bracket 24 is mounted at one end of the base, and secured to this bracket, as by rivets 26, is a roller R. At the center of the roller a stud 28 is provided on which is pivoted a lever L. The lever L may be, in fact, a pair of bars, as illustrated in Fig. 2, to prevent any undesirable binding on the stud 28 and on a second stud 30 carried by the other ends of the levers. Rotatable on the stud 30 is a second roller $R^1$, and these two rollers are connected by links $L^3$ which, in Fig. 1, are shown as a continuous ribbon of metal or the like connected to the rollers as by rivets or the like 32 and 34. An actuating element E is also connected with the stud 30 and may extend to any device to be controlled, such as an indicating needle or dial, or a control device for purposes which will hereinafter appear.

The roller $R^1$ constitutes a caster pivot mounting and has a lever $L^1$ supporting a secondary pivot 36 for a caster wheel 38. The pivot mounting for the caster wheel is thus the pivot 30, whereas the pivot 36 is for the purpose of permitting movement of the caster wheel from a balanced position in response to a condition responsive or pilot means. The pivot 36 may be coincidental with the pivot 30, the relative positions of the two being substantially immaterial.

The condition responsive or pilot means is shown, generally, at P, and may consist of any type of device which is responsive to some condition, such as altitude, pressure, temperature, liquid level or the like, or to any device capable of producing movement for pilot purposes. By way of example, the pilot means P is illustrated as a bellows mounted on a bracket 40 extending from the roller or caster pivot mounting $R^1$ and operatively connected to the secondary pivot 36 for the caster wheel 38 by a link 42 and a lever $L^2$.

Instead of the links $L^3$ being in the form of a ribbon they may be true links, as shown in Fig. 6, with pivots 44 at one end stationary with respect to the base 10 and pivots 46 at their other ends carried by the caster pivot mounting $R^1$.

A very important feature of the torque amplifier is that the spacing between the pivots 44 must be different than the spacing between the pivots 46 or, in Fig. 1, that the roller R must be less in diameter than the roller $R^1$ when the drum rotates in the direction of the arrow. The drum preferably rotates in the direction of the arrow whereas if it is rotated in the opposite direction, the roller R should be greater in diameter than the roller $R^1$. The difference may be on the order of one one-thousandth of an inch or a few thousandths in a device of the approximate size on the drawings, depending upon how little or how much the pilot means P moves throughout its range of movement.

The difference in diameters of the rollers or the distance between the pivots may also be predetermined, depending upon how much movement of the actuating element E is desired in relation to a given movement of the pilot means P, as will hereinafter appear. The nearer the ratio (of diameters in Fig. 1 or pivot spacings in Fig. 6) approach 1:1, the greater will be the magnification of motion.

Figure 9:
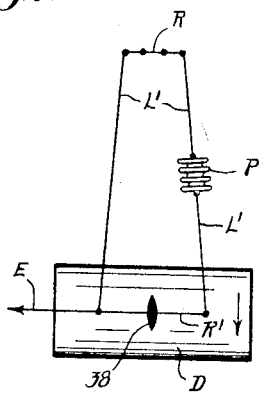

In Fig. 8, the structure of the torque amplifier is modified to the extent that the lever R is pivoted at 17 and is actuated by the pilot means P having one end fixed to a stationary point such as the base 10. The caster wheel 38 is not swiveled to the lever $R^1$ but is rotatable thereon. In Fig. 9 the pilot means is inserted in one of the links $L^1$ so as to shorten or lengthen it. The caster wheel is mounted the same as in Fig. 8.

Practical operation

Referring, first, to Fig. 3, I have shown pivots 44a which are the same distance apart as the pivots 46 instead of closer together, as in Fig. 6. When the caster wheel 38 is aligned with the lever $L^1$, as in Fig. 1, and the drum D is rotating in the direction of the arrow, the caster wheel will stay on the center line 48. When, however, the caster wheel is shifted to some angular position with respect to the lever $L^1$, such as that shown in Fig. 5, caused by a change in the condition affecting the pilot means P, the links $L^3$ will be swung toward the left because of the drum D revolving and the caster wheel being out of alignment with the direction of movement of its surface. Accordingly, if the caster wheel is initially at A in Fig. 4 it will have moved to the position B when the parts are in the position of Fig. 3 and with the caster wheel staying in the same position in relation to $R^1$ and $L^1$ it will continue to describe a path BC and run off the end of the drum.

What is desired, however, is that after the pilot means moves the caster wheel to the position of Fig. 5 the links $L^3$ will swing to the left a predetermined distance corresponding to the new angular relation of the caster wheel to the lever $L^1$ or to the caster pivot mounting $R^1$. I accordingly space the pivots 44 in Fig. 6 closer together than the pivots 46 so that swinging of the links $L^3$ to the left results in rotation of the caster pivot mounting in the same direction so that at a predetermined position the caster wheel is again aligned with the direction of movement of the surface of the drum D. In so doing a path is described as shown by solid lines in Fig. 7 from A to A', which path is a tractrix curve. Accordingly, when the position A' is reached by the caster wheel 38 (which may involve part of one revolution or one or more revolutions of the drum D) the caster wheel is aligned with the direction of movement on a dotted line indicated at 50 and thereafter travels along this path as long as the same angular relation of the caster wheel to the caster pivot mounting is maintained.

In describing the tractrix curve A—A' the links $L^3$ are swung to the left and the speed of swing is greater at first and gradually diminishes until the point A' is reached. Theoretically, the point A' is reached at infinity, but, practically, in a mechanical device of the kind disclosed it is reached within a relatively short time, and thereafter maintained in the new position as long as there is no change in the condition affecting the pilot means P.

The tractrix curve itself may be described as generated by the point A if a line A—B (Fig. 7) is propelled at point B along the line 50 until point A reaches line 50 at A', whereupon B would be at B'. Such a curve is actually an involute of a catenary curve.

By arranging the device so that the caster wheel describes a tractrix curve there is absolutely no over-run or hunting during the operation of the torque amplifier in response to a given change in condition affecting the pilot means P. The actuating element E for an indicator or control device therefore starts to quickly move from an old position to a new position and slows down as it approaches its new position corresponding to the new position of the pilot means P. Obviously, the tractrix curve is described when the pilot means P expands from the position of Fig. 1 instead of contracts, as in Figs. 5 and 6, and the distance between the former line of travel and the final line 50 reached by the caster wheel will depend upon the initial angular displacement of the caster wheel from its previous position. In all instances, a tractrix curve will be described, and there will be no over-run of the actuating element E with relation to the new position taken up by the pilot means P. This holds true whether the change in the pilot means is violent or gradual.

With respect to the differential of distances between pivots 44 and 46, the greater this differential the less will be the movement of the caster wheel in response to a given movement of the pilot means. When the differential is zero, then the displacement is infinity, as in Fig. 4, and, accordingly, it is obvious that the greater the differential above zero the less will be the displacement. In actual practice I have found that from one to two thousandths of an inch differential will cause about ten-fold displacement of the caster wheel with respect to the movement of the movable portion of the pilot means P, and these proportions may be varied to suit different installations.

From the foregoing specification it will be obvious that I have provided a torque amplifier wherein power means may be used to actuate a control device or indicating means requiring considerable power, with the amplifier at all times under control of a pilot means which can be extremely sensitive and delicate and which, through the change in angular position of a caster wheel, results in the actuating element E being operated by the power means with all hunting eliminated. The speed of such response can be controlled by the speed of the drum D.

Figure 10:
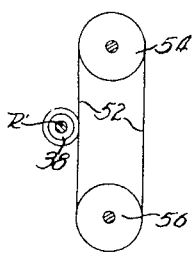
Figure 10 is a diagrammatic view showing a belt instead of a drum to constitute a moving surface for the caster wheel of my mechanical torque amplifier.

Instead of the drum, a belt 52 around rollers 54 and 56 as shown in Figure 10, or any power driven moving surface can be used, as it is merely necessary that a surface be arranged to move in one direction and the caster wheel aligned with that direction as long as a condition responsive or other pilot operating means remains unchanged, with displacement of the plane of the caster wheel from the direction of movement in response to any change in condition. The device is simple in construction and operation, and inexpensive to manufacture. It accomplishes the results of torque amplification in a very satisfactory manner where delicate or sensitive instruments develop insufficient power for operating an indicator or control device. This amplifier is particularly suitable for use in apparatus where the condition responsive means generates insufficient power to operate a valve or the like.

The response of the caster wheel, i. e., its change in angular relation to a former position, may be accomplished in a number of ways as suggested in Figs. 1, 8 and 9. Changes of this character and many others may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

For the purpose of the claims, the types of wheels 38 in Figures 8 and 9 are "caster" wheels as well as the type of Figure 1 as in both cases the wheels are in trailing relation to their mountings (R of Figure 1, 44 of Figure 6 and R of Figures 8 and 9).

I claim as my invention:

1. In a torque amplifier, a surface, power means for moving said surface, a caster wheel resting on said surface and rotated thereby as the surface moves, a caster pivot mounting for said caster wheel, an actuating element connected therewith for movement thereby, means for supporting said caster pivot mounting for movement crosswise of said moving surface, said caster wheel being secondarily pivoted to said caster pivot mounting, condition responsive means for adjusting said caster wheel on its secondary pivot relative to said caster pivot mounting, and means to rotate said caster pivot mounting in a direction to align said caster wheel with the direction of travel of said moving surface after the caster wheel is pivoted on said secondary pivot by said condition responsive means whereby said power means moves said caster pivot mounting and thereby said actuating element through the medium of said moving surface and said caster wheel with the caster wheel describing a tractrix curve on said moving surface between the point where said caster wheel is moved by said condition responsive means and a finally rebalanced position without any hunting tendency.

2. In a torque amplifier, a surface, power means for moving said surface, a caster wheel resting on said surface and rotated thereby as the surface moves, a caster pivot mounting for said caster wheel, an actuating element connected therewith for movement thereby, means for supporting said caster pivot mounting for movement crosswise laterally of said moving surface, said caster wheel being secondarily pivoted to said caster pivot mounting, pilot means for adjusting said caster wheel on its secondary pivot relative to said caster pivot mounting, and means to rotate said caster pivot mounting in a direction to align said caster wheel with the direction of travel of said moving surface as the caster wheel is moved laterally by said moving surface with the caster wheel describing a tractrix curve on said movable surface between the point where said caster wheel is moved by said pilot means and a finally rebalanced position.

3. A torque amplifier comprising a surface, power means for moving said surface, a caster wheel resting on said surface, a caster pivot mounting for said caster wheel, means for supporting said caster pivot mounting for swinging movement crosswise of said moving surface, said caster wheel being secondarily pivoted to said caster pivot mounting, pilot means for adjusting said caster wheel on its secondary pivot, means to rotate said caster pivot mounting in a direction to re-align said caster wheel with the direction of travel of said moving surface, and an actuating element operatively connected with said caster pivot mounting for movement thereby.

4. A torque amplifier of the character disclosed comprising a drum, power means for rotating said drum in one direction, a caster wheel resting on the surface of said drum and rotated thereby as the drum revolves, a caster pivot mounting for said caster wheel, an actuating element operatively connected therewith for movement thereby, linkage for supporting said caster pivot mounting for movement in a direction substantially parallel to the axis of said rotating drum, said caster pivot mounting having a secondary pivot for said caster wheel, pilot means carried by said caster pivot mounting and having a movable portion connected with said caster wheel for adjusting it around said secondary pivot, and means for rotating said caster pivot mounting in a direction to align said caster wheel with the direction of travel of said moving surface after the caster wheel is pivoted on said secondary pivot by said pilot means comprising link connections stationarily pivoted at one end and movably pivoted to said caster pivot mounting at the other end with the spacing different at the stationary end than at said other end whereby swinging of said caster pivot mounting in one direction results in rotation thereof in a direction to cause said power means to move said caster pivot mounting and thereby said actuating element through said drum and said caster wheel, with the caster wheel describing a tractrix curve on said drum between the point where said caster wheel is moved from its initial position and a finally rebalanced position without hunting.

5. A torque amplifier of the character disclosed comprising a drum, power means for rotating said drum in one direction, a caster wheel resting on the surface of said drum and rotated thereby as the drum revolves, a caster pivot mounting for said caster wheel, an actuating element operatively connected therewith for movement thereby, linkage for supporting said caster pivot mounting for movement in a direction substantially parallel to the axis of said rotating drum, said caster pivot mounting having a secondary pivot for said caster wheel, pilot means carried by said caster pivot mounting and having a movable portion connected with said caster wheel for adjusting it around said secondary pivot, and means for rotating said caster pivot mounting in a direction to align said caster wheel with the direction of travel of said moving surface after the caster wheel is pivoted on said secondary pivot by said pilot means.

6. A torque amplifier of the character disclosed comprising a movable surface, power means for moving said surface in one direction, a caster wheel resting on said surface and rotated thereby as the surface moves, a caster pivot mounting for said caster wheel, an actuating element operatively connected therewith for movement thereby, linkage for supporting said caster pivot mounting for movement crosswise of said moving surface, said caster pivot mounting having a secondary pivot for said caster wheel, condition responsive pilot means carried by said caster pivot mounting and having a movable portion connected with said caster wheel for adjusting it around said secondary pivot, and means for rotating said caster pivot mounting in a direction to re-align said caster wheel with the direction of travel of said moving surface.

7. In a torque amplifier of the kind disclosed, a frame, a caster pivot mounting having a link connection with said frame with the spacing between the links where they are connected with the frame being unequal with respect to their connection with the caster pivot mounting whereby swinging of said links and mounting in one direction results in rotation thereof, a drum supported on said frame, a caster wheel supported on said drum and pivoted to said caster pivot mounting, power means mounted on said base for rotating said drum, a condition responsive pilot means carried by said caster pivot mounting for changing the angle of said caster wheel relative thereto whereby said power means moves said caster pivot mounting through the medium of said rotating drum and said caster wheel with the caster wheel describing a tractrix curve on said drum until a rebalanced position of the caster wheel displaced from its initial position is assumed as a result of such rotation of said mounting, and an actuating element operatively connected with said mounting for movement thereby.

8. In a torque amplifier, a frame, a caster pivot mounting having a link connection with said frame with the spacing between the links where they are connected with the frame being different than where they are connected with the caster pivot mounting whereby swinging of said mounting in one direction results in angular rebalancing rotation thereof, a movable surface supported on said frame, a caster wheel supported on said movable surface and pivoted to said caster pivot mounting, power means mounted on said frame for moving said surface, and pilot means carried by said caster pivot mounting for changing the angle of said caster wheel relative thereto to effect an angular unbalancing thereof.

9. In a torque amplifier, a surface, power means for moving said surface, a caster wheel resting on said surface and rotated thereby as the surface moves, means for supporting said caster wheel for movement crosswise of said moving surface, an actuating element connected therewith for movement thereby, means for supporting said caster pivot mounting, condition responsive means for adjusting the angle of said caster wheel relative to the direction of movement of said moving surface in proportion to a change in the condition affecting said condition responsive means, and means to rotate said caster pivot mounting in a direction to align said caster wheel with the direction of travel of said moving surface after the caster wheel is moved crosswise of said moving surface by said power means, said actuating element, through the medium of said moving surface and said caster wheel, being moved to a new position corresponding to the new position of said condition responsive means with the caster wheel describing a tractrix curve on said moving surface between the point where the angle of said caster wheel is adjusted by said condition responsive means and a finally rebalancing position.

10. In a torque amplifier, a surface, power means for moving said surface, a caster wheel resting on said surface and rotated thereby as the surface moves, a pivot mounting for said caster wheel, an actuating element connected therewith for movement thereby, means for supporting said mounting for movement laterally of said moving surface, said caster wheel being pivoted to said mounting, pilot means for angularly adjusting said caster wheel relative to said mounting, and means to rotate said caster wheel in a direction to align its plane with the direction of travel of said moving surface as the caster wheel is moved laterally thereby until a point is reached where said caster wheel assumes a rebalanced position.

11. A torque amplifier comprising a surface, power means for moving said surface, a caster wheel resting on said surface, a caster mounting for said caster wheel, means for supporting said caster mounting for swinging movement crosswise of said moving surface, pilot means for adjusting said caster wheel and double link means to rotate said caster mounting in a direction to re-align said caster wheel with the direction of travel of said moving surface when the mounting assumes a predetermined position corresponding to the position of said pilot means, said double link means having pivoted connections at the ends thereof, the pivots at one end being closer together than the pivots at the other end to effect such re-aligning rotation of said caster wheel mounting.

12. A torque amplifier of the character disclosed comprising a drum, power means for rotating said drum, a caster wheel resting on the surface of said drum and rotated thereby as the drum revolves, an actuating element operatively connected therewith for movement thereby, linkage for supporting said caster wheel for movement in a direction substantially parallel to the axis of said rotating drum, pilot means having a movable portion connected with said caster wheel for adjusting it in angular relation to a plane at right angles to the plane of rotation of said drum, and means for rotating said caster wheel in a direction to align it with said plane after the caster wheel is adjusted by said pilot means comprising a pair of links with the spacing different at one end thereof than at the other end whereby swinging of said links results in rotation of said caster wheel in a direction to re-align it with said plane, with the caster wheel describing a tractrix curve on said drum between the point where said caster wheel is adjusted from its initial position and a finally rebalanced position.

13. A torque amplifier of the character disclosed comprising a drum, power means for rotating said drum, a caster wheel resting on the surface of said drum and rotated thereby as the drum revolves, an actuating element operatively connected therewith for movement thereby, linkage for supporting said caster pivot mounting for movement in a direction substantially parallel to the axis of rotation of said drum, pilot means for adjusting said caster wheel to an angular position relative to a plane at right angles to said axis of rotation, said linkage comprising a pair of non-parallel links pivoted at their ends to effect angularly readjustment of said caster wheel to position it in a plane parallel to said first mentioned plane after the caster wheel is so adjusted by said pilot means.

14. A mechanical torque amplifier comprising a movable surface, power means for moving said surface, a caster wheel resting on said surface and rotated thereby as the surface moves, a double linkage arrangement for mounting said caster wheel, an actuating element operatively connected therewith for movement thereby, said linkage supporting said mounting for movement crosswise of said moving surface, condition responsive pilot means having a movable portion operatively connected with said caster wheel for adjusting it to an angle relative to the direction of motion of said surface, said linkage being pivoted with the spacing between pivots thereof at the ends of the linkage arrangement farthest from the caster wheel being less than at the end adjacent the caster wheel for adjusting said caster wheel to re-align it with said direction of motion after the linkage has moved to a position proportionally corresponding to said pilot means.

15. In a mechanical torque amplifier, a frame, a caster mounting having a link connection with said frame with the spacing between the links where they are connected with the frame being different than where they are connected with said caster mounting, a drum supported on said frame, a caster wheel supported on said drum and rotatably carried by said caster mounting, power means mounted for rotating said drum, pilot means for changing the angle of said caster wheel relative to said drum whereby said power means moves said caster mounting through the medium of said rotating drum and said caster wheel, with the caster wheel describing a tractrix curve on said drum until a rebalanced position of the caster wheel displaced from its initial position is assumed, and actuating means operatively connected with said caster mounting for movement thereby.

16. In a torque amplifier, a frame, a caster mounting having a dual pivoted link connection with said frame in which the links diverge in a direction away from said caster mounting and toward said frame, a movable surface supported on said frame, a caster wheel supported on said movable surface and mounted on said caster mounting, power means for moving said surface, and pilot means for changing the angle of said caster wheel relative to said surface in proportion to the degree of movement of said pilot means.

17. In a torque amplifier, a power driven member constantly moved in a predetermined direction, a rotatable caster wheel in contact with said member and rotated thereby, the normal position of said caster wheel being such that its axis of rotation is perpendicular to the direction of movement of said member, dual means mounting said caster wheel for angular rotation out of its normal position and for bodily movement crosswise relative to the direction of movement of said member, said dual mounting means having stationary pivots for mounting the means and movable pivots for mounting said caster wheel, and means for angularly moving said caster wheel out of its normal position whereby the interaction of said caster wheel and member causes said caster wheel to move crosswise on said member, said dual mounting means being arranged with said movable pivots spaced farther apart than said stationary pivots that the crosswise movement of said caster wheel causes reverse angular movement thereof towards its normal position.

18. In a torque amplifier, a power driven member having a surface constantly moved in a predetermined direction, a rotatable caster wheel in contact with said surface and rotated thereby, the normal position of said caster wheel being such that its axis of rotation is perpendicular to the direction of movement of said surface, unequal links mounting said caster wheel for angular rotation out of its normal position and for bodily movement crosswise relative to the direction of movement of said surface, and means for angularly moving said caster wheel out of its normal position whereby the interaction of said caster wheel with said surface causes said caster wheel to move crosswise on said surface, said links causing the crosswise movement of said caster wheel to reverse the angular movement thereof towards its normal position.

19. In a torque amplifier, a power driven member having a surface constantly moved in a predetermined direction, a rotatable caster wheel in contact with said surface and rotated thereby, the normal position of said caster wheel being such that its axis of rotation is perpendicular to the direction of movement of said surface, unequal links mounting said caster wheel for angular rotation out of its normal position and for bodily movement crosswise relative to the direction of movement of said surface, and means interposed in one of said links to effect angular movement of said caster wheel out of its normal position in proportion to the condition affecting said last means whereby the interaction of said caster wheel with said surface causes said caster wheel to move crosswise on said surface, said links causing the crosswise movement of said caster wheel to reverse the angular movement thereof towards its normal position.

20. In a torque amplifier, a power driven member having a surface constantly moved in a predetermined direction, a rotatable caster wheel in contact with said surface and rotated thereby, the normal position of said caster wheel being such that its axis of rotation is perpendicular to the direction of movement of said surface, unequal pivoted links mounting said caster wheel for angular rotation out of its normal position and for bodily movement crosswise relative to the direction of movement of said surface, and means for shifting the pivots for said links and thereby effecting angular movement of said caster wheel out of its normal position in proportion to the condition affecting said last means whereby the interaction of said caster wheel with said surface causes said caster wheel to move crosswise on said surface, said links causing the crosswise movement of said caster wheel to reverse the angular movement thereof towards its normal position.

21. In a torque amplifier, a power driven member having a surface constantly moved in a predetermined direction, a rotatable caster wheel in contact with said surface and rotated thereby, the normal position of said caster wheel being such that its axis of rotation is perpendicular to the direction of movement of said surface, unequal links mounting said caster wheel for angular rotation out of its normal position and for bodily movement crosswise relative to the direction of movement of said surface, and means for effecting angular rotation of said caster wheel out of its normal position relative to said surface in proportion to the condition affecting said condition responsive means whereby the interaction of said caster wheel with said surface causes said caster wheel to move crosswise on said surface, said links causing the crosswise movement of said caster wheel to reverse the angular movement thereof towards its normal position.

GEORGE L. BORELL.